United States Patent [19]

McShane

[11] Patent Number: 4,787,240
[45] Date of Patent: Nov. 29, 1988

[54] LIQUID MEASUREMENT ARRANGEMENT

[75] Inventor: James L. McShane, Churchill Boro, Pa.

[73] Assignee: Westinghouse Electric Corp., Pittsburgh, Pa.

[21] Appl. No.: 91,226

[22] Filed: Aug. 31, 1987

[51] Int. Cl.$^4$ ............................................. G01F 23/28
[52] U.S. Cl. .................................... 73/290 V; 340/621; 73/861.29
[58] Field of Search .......... 73/290 V, 861.29, 861.31, 73/622, 597; 340/621; 374/117, 118, 119

[56] References Cited

U.S. PATENT DOCUMENTS

| 2,274,262 | 2/1942 | Wolff | 374/119 |
|---|---|---|---|
| 2,990,543 | 6/1961 | Rod | 73/290 V |
| 3,553,636 | 1/1971 | Baird | 73/290 V |
| 4,103,551 | 8/1978 | Lynnworth | 73/861.31 |
| 4,112,773 | 9/1978 | Abts | 73/642 |
| 4,265,125 | 5/1981 | Mahany | 374/117 |
| 4,316,183 | 2/1982 | Palmer et al. | 340/621 |
| 4,608,507 | 8/1986 | Neubauer et al. | 310/326 |
| 4,630,245 | 12/1986 | Dam | 340/621 |
| 4,683,752 | 8/1987 | Bradshaw | 73/290 V |

FOREIGN PATENT DOCUMENTS

| 0021522 | 2/1983 | Japan | 73/290 V |
|---|---|---|---|
| 309244 | 7/1971 | U.S.S.R. | 73/861.29 |
| 488983 | 10/1975 | U.S.S.R. | 73/861.29 |
| 2129130 | 5/1984 | United Kingdom | 374/117 |

*Primary Examiner*—Allan N. Shoap
*Assistant Examiner*—Thomas B. Will
*Attorney, Agent, or Firm*—D. Schron

[57] ABSTRACT

A pipe section through which a liquid passes includes a transmitting and receiving transducer diametrically opposed on the surface of the pipe and arranged to project acoustic energy through the interior of the pipe whereby the output signal from the receiving transducer changes in the presence of a liquid in the acoustic path between the transducers. V-shaped grooves or other surface modifications are made to the surface of the pipe circumferentially between the transducers so as to redirect wall-borne acoustic energy to a more axial direction thus preventing its reception at the receiving transducer.

10 Claims, 4 Drawing Sheets

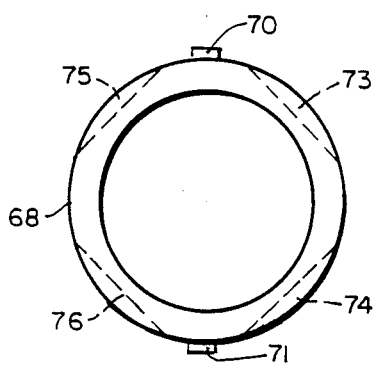
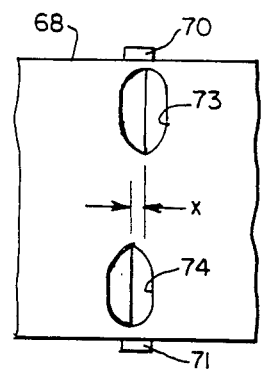
FIG. 4B.  FIG. 4A.
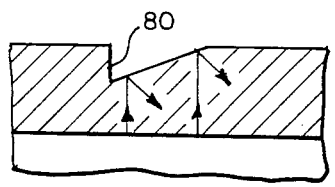
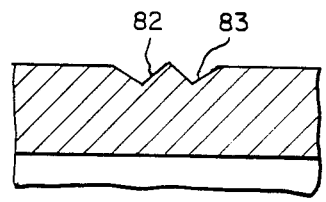
FIG. 5A.  FIG. 5B.
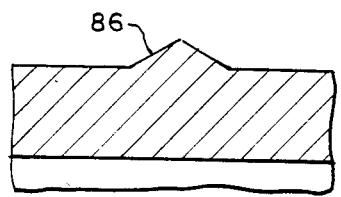
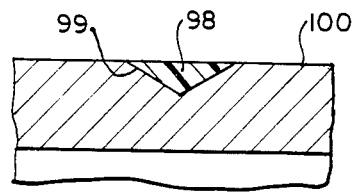
FIG. 5C.  FIG. 7.

LIQUID MEASUREMENT ARRANGEMENT

BACKGROUND OF THE INVENTION

Field of the Invention:

The invention in general relates to an arrangement for measuring a selected parameter of a liquid, and more particularly to apparatus which utilizes acoustic transducers.

Description of the Prior Art:

Acoustic methods are often utilized for determining a predetermined parameter of a liquid contained and movable within a structure. By way of example, the level of a liquid within a standing pipe or a vessel may be determined by a pulse echo arrangement wherein an acoustic transducer transmits a pulse through the liquid toward the liquid surface and the return signal therefrom, suitably processed, provides an indication of the liquid surface height above some reference point.

In another arrangement, diametrically opposed transducers coupled to the structure surface are arranged such that an acoustic pulse transmitted from one to the other will provide a different response when transmitted through a gas as opposed to through the liquid thereby giving an indication of the presence of the liquid, at the transducer level.

A problem often arises in the use of such systems in that acoustic energy transmitted through the fluid containing structure also propagates within the structure wall material and can severely degrade proper operation.

The present arrangement substantially reduces the wall-borne acoustic energy so as to provide for a more accurate detection system.

SUMMARY OF THE INVENTION

The liquid measuring system in accordance with the present invention includes a structure having an outside wall portion and an interior in which a liquid is movable. At least one acoustic transducer is coupled to the wall of the structure and is operable to transmit acoustic energy through the wall to the interior of the structure. The structure includes an anomaly portion on either side of the transducer with each anomaly portion generally extending laterally of the transducer. The anomaly portion is constructed and arranged such that acoustic energy which would normally be transmitted circumferentially around the wall of the structure will reflect off of the anomaly portion and be redirected to a more axial direction within the wall structure.

BRIEF DESCRIPTION OF THE DRAWINGS

FIG. 4A is a view of an alternate embodiment of the present invention and FIG. 4B is an end view thereof;

FIGS. 5A-5C illustrate other alternative embodiments of the present invention;

FIG. 7 illustrates a groove filled with an acoustically lossy material.

DESCRIPTION OF THE PREFERRED EMBODIMENTS

Figure 1A:
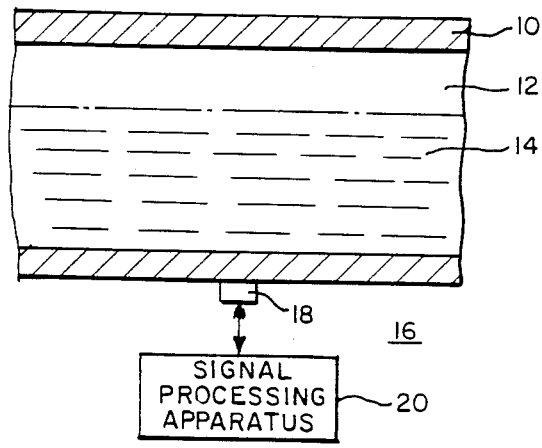
FIGS. 1A and 1B are partial sectional views illustrating two different arrangements by which liquid level may be measured utilizing the propagation of acoustic energy.

Referring now to FIG. 1A, there is illustrated by way of example a portion of a pipe 10 or other vessel having an interior 12 for containing a movable liquid 14. In FIG. 1A the level of the liquid 14 is to be monitored by means of a level detection system 16 which includes an acoustic transducer 18 coupled to the outside surface of the vessel and in electrical signal communication with signal processing apparatus 20. In a well known manner, transducer 18 is caused to transmit an acoustic pulse upward through the vessel wall toward the surface of the liquid the return signal from which is detected by transducer 18 whereby the signal processing apparatus 20 determines the round trip transmit time to provide an indication of liquid level.

Figure 1B:
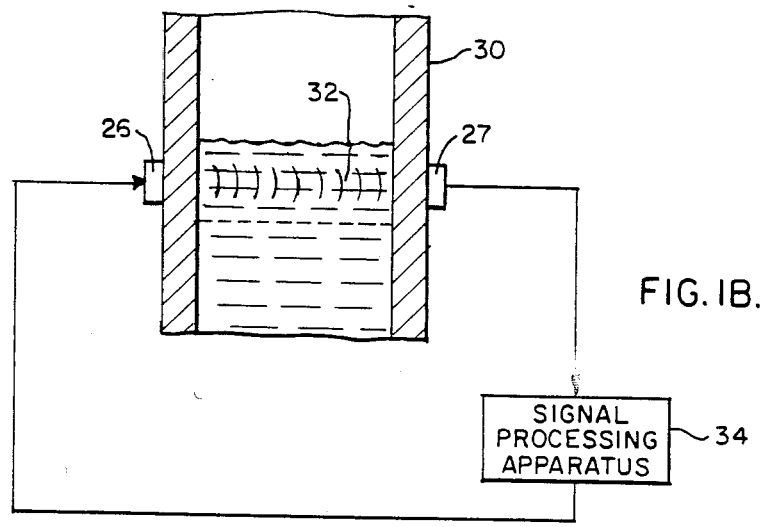

FIG. 1B illustrates another type of liquid level detector wherein two transducers 26 and 27 are coupled to the outside surface of a vessel such as a standing pipe 30, the interior of which includes a liquid 32 which may rise in the pipe.

In operation, signal processing apparatus 34 causes transducer 26 to transmit an acoustic pulse through the pipe wall toward transducer 27 acting as a receiver. If the liquid level is as indicated by the dotted line, then the acoustic pulse will be transmitted through a gas which normally causes a completely different output signal from the receiving transducer compared with transmission through the liquid itself, as indicated by the liquid level in the Figure. Accordingly, by examining the signal provided by the receiving transducer it may be determined from the difference in received signals, when the liquid level reaches the height of the transducers.

Figure 2:
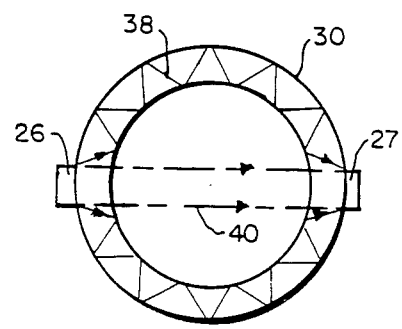
FIG. 2 is a sectional view of the standpipe arrangement of FIG. 1B illustrating the principal of wall-borne acoustic energy.

When a transmitting transducer such as in FIGS. 1A or 1B is coupled to the outside surface of the vessel wall, a problem arises in that acoustic waves propagate in the wall itself by means of multiple reflections, as indicated in the sectional view of FIG. 2 as an example. The multiple acoustic reflections, known as wraparound and as depicted by the acoustic rays 38, travel from the transmitting transducer 26 circumferentially in two directions around the pipe wall 30 and are detected by the receiving transducer 27. This transducer provides an output signal which may erroneously indicate the presence of a liquid when in actuality there is none, a fact which could be established by the normal diametrical acoustic projection 40 through the pipe interior were it not for the presence of the wraparound energy 38.

FIGS. 3A-3D illustrate one embodiment of the present invention which substantially reduces the deleterious effects of wraparound acoustic energy. In these figures a pipe section 50 having a longitudinal axis A is illustrated by way of example and includes transmitting and receiving transducers 52 and 53 coupled to the outside surface of the pipe wall and being diametrically opposed.

The pipe section 50 includes an anomaly portion on either side of the transducers each anomaly portion extending laterally in a circumferential direction. The anomaly portion illustrated in FIGS. 3A-3D takes the form of respective V-shaped grooves 56 and 57. The width of a typical groove, that is, the axial dimension W is greater than the diameter d of either one of the transducers 52 and 53. Each end of each groove makes a gradual transition with the pipe outer surface in order to avoid reflecting surfaces perpendicular to the acoustic wave direction in the pipe wall.

Figure 3A:
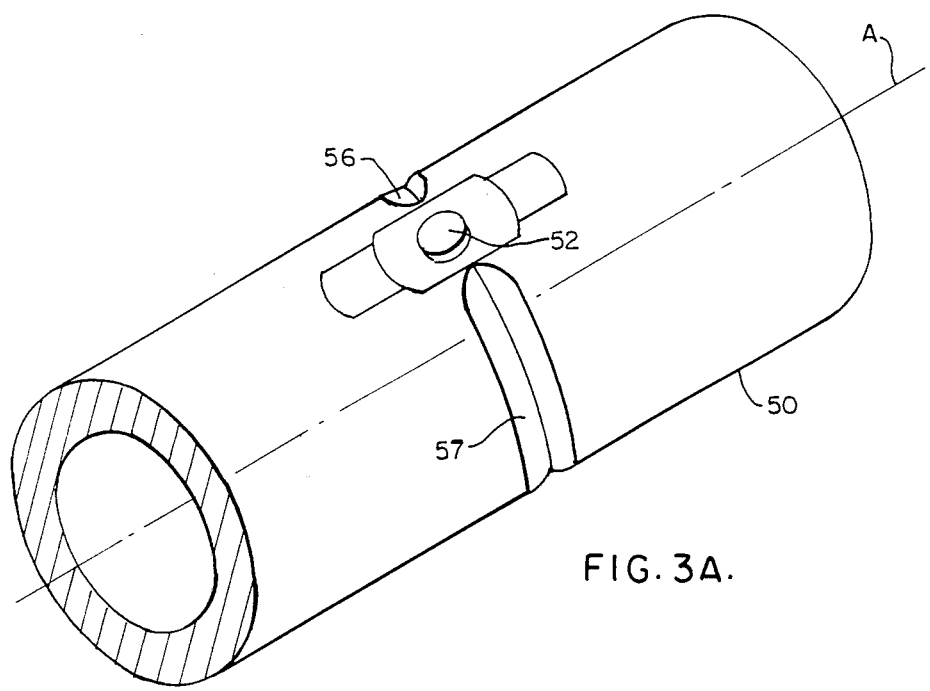
FIG. 3A shows an acoustic transducer coupled to a pipe and illustrates an embodiment of the present invention.
Figure 3B:
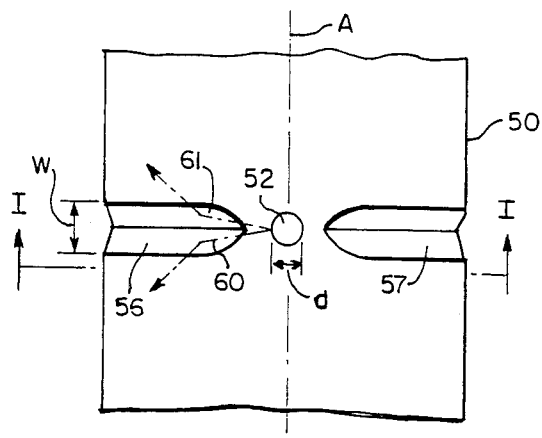
FIG. 3B is a plan view of the pipe illustrated in FIG. 3A and further illustrates the propagation of acoustic energy.
Figure 3C:
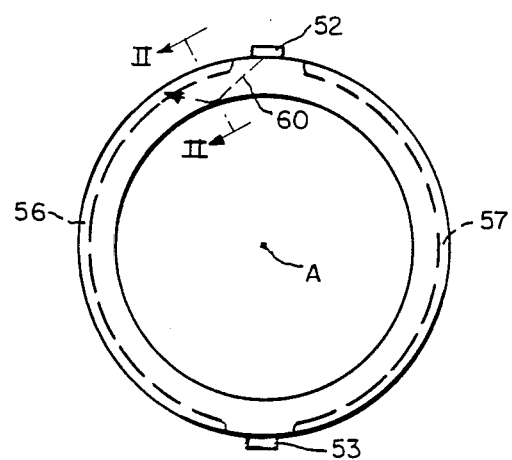
FIG. 3C is a view along line I—I of FIG. 3B.

Acoustic energy emanating from transducer 52 and as depicted by typical acoustic rays 60 and 61 strike the inside surface-air interface of pipe section 50 and is reflected therefrom as illustrated in FIG. 3C which is a view along line I—I of FIG. 3B. After reflection from the inside surface of pipe section 50 the acoustic ray strikes the sloping surface of the groove 56 and is deflected in a more axial direction within the pipe section so that very little of it reaches the opposed transducer 53.

Figure 3D:
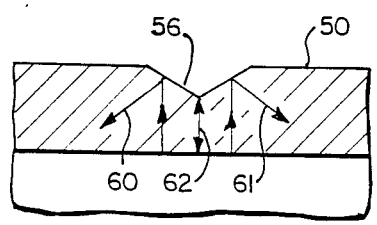
FIG. 3D is a view along line II—II of FIG. 3C.

The acoustic rays having numerals 60 and 61 in FIG. 3D, which is a view along line II—II of FIG. 3C are actually projections of the acoustic paths onto the plane of the figure; the actual acoustic rays would be arriving at an angle and would be reflected at an angle relative to the plane of the figure.

The acoustic ray 62 in FIG. 3D represents a reflection from the bottom of the groove which has a finite radius and would accordingly allow some energy to reach the receiving transducer by multiple reflections. Since most of the wall-borne energy is redirected to a more axial direction, the circumferential energy reflected from the bottom of the V-shaped groove would be of greatly reduced intensity by the time it reaches the receiving transducer 53. In order to substantially eliminate any circumferential energy from reaching the receiving transducer, an arrangement such as illustrated in FIGS. 4A and 4B may be utilized.

The pipe section 68 in FIGS. 4A and 4B include transmitting and receiving transducers 70 and 71 coupled to the outside surface thereof with anomaly portions 73 to 75 circumferentially arranged between the transducers. More particularly the anomaly portions take the form of V-shaped grooves with groves 73 and 74 being offset from one another in a longitudinal direction by an amount x, as would be grooves 75 and 76. As best seen in FIG. 4B, these grooves do not follow the circumferential curvature as in FIG. 3C, but rather are produced by straight cuts, thus facilitating the machining process.

FIGS. 5A-5C are portions of pipe segments illustrating other types of anomaly portions which may be utilized. In FIG. 5A a groove is utilized however the groove is not V-shaped as previously described but includes a surface 80 which lies in a plane perpendicular to the pipe's longitudinal axis. With this type of groove, there is no bottom edge in line with either of the transducers and so eliminates multiple circumferential reflections. FIG. 5B illustrates two side-by-side V-shaped grooves 82 and 83 such arrangement being utilized in instances where the depth of the groove is to be minimized so as to minimize any weakening of the pipe section.

FIG. 5C illustrates a raised V-shaped anomaly portion 86 which accomplishes the redirection of reflected internal energy without the necessity for cutting into the pipe wall.

Figure 6:
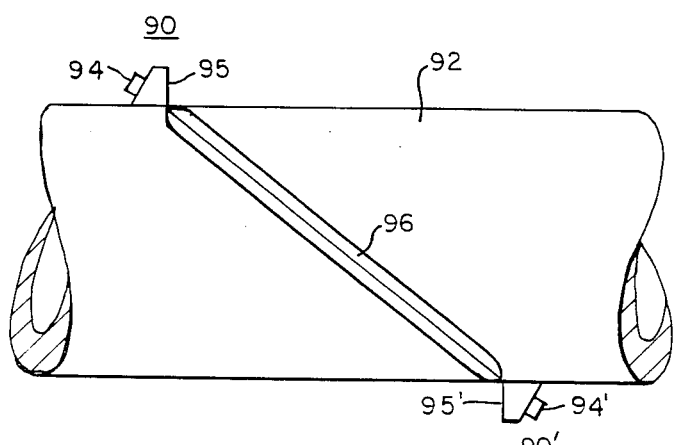
FIG. 6 illustrates an embodiment of the invention as applicable to an acoustic flowmeter.

Although the invention has been described by way of example with respect to a pipe section in which the level of a liquid is to be determined, it is to be understood that the principles of the present invention can be applied to other types of liquid containing vessels. The principles may be applied to acoustic flow meters such as in FIG. 6 wherein acoustic energy is transmitted between transmitting receiving transducer stations 90 and 90' to determine the flow rate of liquid within a pipe 92. As is well known, each transducer station 90, 90' includes a respective transducer element 94, 94' and a coupling block 95, 95' in contact with the surface of pipe 92. A groove 96, similar to groove 56 of FIG. 3A is cut into the pipe wall and extends between transducer stations. A similar groove, corresponding to groove 57 of FIG. 3A would extend between transducer stations on the unseen side of pipe 92 in FIG. 6, with the two grooves being operable to inhibit wall-borne acoustic energy from masking acoustic signals propagated through the liquid medium within pipe 92.

The grooves or other surface modifications described herein can be of various sizes, shapes and orientations and can be located in or on the surface of a liquid containing structure itself or can be part of a separate unit which is joined with an existing structure. To further enhance operation the grooves can be filled with an acoustically lossy material such as indicated in FIG. 7 by numeral 98, filling the groove 99 within a pipe wall 100.

What is claimed is:

1. Apparatus for use in a liquid measuring system, comprising:
   (A) a structure having an outside wall and an interior in which a liquid is relatively movable;
   (B) at least one acoustic transducer coupled to said structure and operable to transmit acoustic energy through said wall to said interior;
   (C) said wall including at least one groove on either side of said transducer, each said groove extending laterally of said transducer;
   (D) each said groove being constructed and arranged that acoustic energy which would normally be transmitted laterally through said wall will reflect off of said groove and be redirected to an off lateral direction.

2. Apparatus according to claim 1 wherein:
   (A) said grooves are V-shaped.

3. Apparatus according to claim 1 wherein:
   (A) said structure is a pipe having a longitudinal axis;
   (B) said grooves redirect reflected acoustic energy travelling in a circumferential direction to a more axial direction.

4. Apparatus according to claim 3 wherein:
   (A) said grooves are circumferential.

5. Apparatus according to claim 3 which includes:
   (A) at least a second acoustic transducer coupled to said pipe and being diametrically opposed with respect to said one acoustic transducer;
   (B) said grooves include a first groove which extends generally circumferentially from one side of said one transducer toward said second transducer and a second groove which extends generally circumferentially from an opposite side of said one transducer toward said second transducer.

6. Apparatus according to claim 5 wherein:
   (A) said first and second grooves are V-shaped.

7. Apparatus according to claim 5 wherein:

(A) the axial dimension of each said groove is greater than the axial dimension of each said transducer.

8. Apparatus according to claim 3 which includes:
(A) a plurality of adjacent circumferentially extending grooves.

9. Apparatus according to claim 3 which includes:
(A) a plurality of nonadjacent grooves arranged circumferentially and axially offset from one another.

10. Apparatus for use in a liquid measuring system, comprising:
(A) a structure having an outside wall and an interior in which a liquid is relatively movable;
(B) at least one acoustic transducer coupled to said structure and operable to transmit acoustic energy through said wall to said interior;
(C) said wall including at least one V-shaped projection portion on either side of said transducer, each said V-shaped projection portion extending laterally of said transducer;
(D) each said V-shaped projection portion being constructed and arranged that acoustic energy which would normally be transmitted laterally through said wall will reflect off of said V-shaped projection portion and be redirected to an off lateral direction.

* * * * *